United States Patent [19]

Connell et al.

[11] Patent Number: 5,327,484
[45] Date of Patent: Jul. 5, 1994

[54] CALLING SYSTEM FOR SHORT DURATION DATA TRANSACTIONS

[75] Inventors: Francis J. Connell, Somerset; Travis H. Gordon, Madison, both of N.J.

[73] Assignee: AT&T Bell Laboratories, Murray Hill, N.J.

[21] Appl. No.: 876,890

[22] Filed: Apr. 30, 1992

[51] Int. Cl.$^5$ .................... H04M 11/00; H04M 3/00
[52] U.S. Cl. ........................ 379/93; 379/94; 379/334
[58] Field of Search ............ 379/91, 92, 93, 95, 379/201, 216, 207, 209, 265, 266, 142, 247, 309, 334, 335, 337, 94; 370/56

[56] References Cited

U.S. PATENT DOCUMENTS

| | | | |
|---|---|---|---|
| 3,969,589 | 7/1976 | Meise, Jr. et al. | 179/27 D |
| 4,599,493 | 7/1986 | Cave | 379/309 |
| 4,788,715 | 11/1988 | Lee | 379/84 |
| 4,899,373 | 2/1990 | Lee et al. | 379/207 |
| 4,922,519 | 5/1990 | Daudelin | 379/67 |
| 4,982,421 | 1/1991 | Kirsch et al. | 379/216 |
| 5,187,740 | 2/1993 | Swaim et al. | 379/209 |
| 5,189,694 | 2/1993 | Garland | 379/106 |

OTHER PUBLICATIONS

AT&T Technical Journal, vol. 64, No. 6, part 2, pp. 1305-1564, Jul./Aug., 1985 (Cover sheet and Index only are attached due to voluminous nature of publication-complete text will be furnished if requested).

Bell System Technical Journal (BSTJ), vol. 56, No. 7, pp. 1015-1320, Sep., 1977. Cover sheet and Index only are attached due to voluminous nature of publication-complete text will be furnished if requested).

Engineering and Operations in the Bell System, Second Edition, pp. 292-294, AT&T Bell Laboratories, Inc., 1982.

*Primary Examiner*—Curtis Kuntz
*Assistant Examiner*—I. Rana
*Attorney, Agent, or Firm*—Barry H. Freedman

[57] ABSTRACT

A system and a method for completing over a communication switching system a series of short duration calls directed to a common destination and initiated from a plurality of sources connected to a call queuing apparatus linked to the communication switching system. When the dedicated link from the call queuing apparatus to the communication switching system is in use, subsequent calls in the series are queued. Without relinquishing control of the link, these calls are thereafter connected to the communication switching system, preferably on a first-come first-serve basis. The invention allows the overhead of call setup, both cost and setup time, to be spread over the entire series of calls, as opposed to being borne by each call in the series.

16 Claims, 4 Drawing Sheets

CALLING SYSTEM FOR SHORT DURATION DATA TRANSACTIONS

TECHNICAL FIELD

This invention relates to access arrangements for transactional processing, and more specifically to a method and system for completing bursts of calls servicing short duration data transactions.

BACKGROUND OF THE INVENTION

Advances in computer technology in general, and database search and retrieval techniques in particular have given birth to various forms of transaction processing methods to implement diverse types of applications, such as credit authorization and identity verification. Typically, these transactions involve transmission of a search key to a database which returns to the inquirer a field or a record of limited size. In general, transactional communications can be described as short and bursty traffic that requires secure, rapid and cost effective access to a validation or authorization database. In response to this need of the marketplace, two major types of communications access arrangements have been devised.

One popular access arrangement for transactional processing is a multidrop private line connected directly to a database or a front-end processor attached to the database which polls, on a regular basis, terminals connected to a cluster controller at each drop of the line. Analog multidrop private lines are arguably cost effective for large businesses with a great number of users because they take advantage of economies of scale due to concentration of traffic generated by a great number of terminals at clustered locations. However, for small to medium size businesses with a limited number of users, the monthly leasing cost of a multidrop private line can be prohibitive.

Even for large businesses, multidrop private lines present various disadvantages that greatly outweight their perceived cost effectiveness. For example, the known unreliability of multidrop private lines creates a need for expensive redundant circuits and networking hardware that also need to be managed and administered. In addition, systems that use multidrop private lines a) lack flexibility in terms of network reconfiguration, and b) confine users to a limited choice of vendors for hardware and software, resulting in a major handicap in the age of open systems. Finally, unlike switched communications lines, multidrop private lines are not ubiquitously available.

Another access arrangement for transactional processing involves the use of a switched communication line. In this arrangement, terminals equipped with modems, autodialers, magnetic stripe readers and the like, initiate data calls automatically over a communication switching system to establish communications with a database in response to a specific action by an inquirer. For small to medium size groups of users generating low volume traffic and unable to justify the cost of private lines, this arrangement provides expensive but ubiquitous access to a database. Because of the high cost per transaction associated with this arrangement, certain groups of users in low profit margin businesses, such as small retailers, cannot afford this solution and therefore may refuse to accept any form of payment requiring credit authorization. Other operational drawbacks of this arrangement include the long call setup time needed to complete the transaction and the unsecure access which makes the system vulnerable to security breaches by intruders.

SUMMARY OF THE INVENTION

The present invention is directed at providing an arrangement for transactional processing that is secure, economical, fast, reliable and ubiquitous. In accordance with the invention, a plurality of sources of short data traffic, such as Point-of-Sale (POS) terminals and credit card readers, are connected to a queuing apparatus, such as a line concentrator, which in turn is connected to a database (or other common destination) via a switched connection over a communication switching system. When a source sends a request for connection to the concentrator, the latter uses an access link to a communication switching system to establish a connection to the database. The communication switching system uses a pre-stored non-dialable routing number associated with that link to route the call to the database or common destination. Once the access link from the concentrator to the communication switching system has been placed in use, the line concentrator queues all subsequent data calls from the sources and completes the calls in the current burst of calls preferably on a first-come-first-serve basis. As used herein, the term burst of calls refers to a group or series of calls initiated a) from the plurality of sources connected to the line concentrator, and b) within a relatively short time period. The line concentrator is arranged to maintain the connection to the host until all calls in the queue have been completed. The connection is then released and the process is repeated for each burst of traffic. Thus, the invention allows the overhead of call setup, both cost and setup time, to be spread over a number of transactions. Connection to the line concentrator may be via local switched access, or dedicated access. In the switched access arrangement, users initiate a call to the concentrator, which in turn may send an off-hook signal to the communication switching system to access the database or the common destination. In the dedicated access arrangement, devices, such as POS terminals and card readers, are connected to the concentrator via analog or digital private lines.

Advantageously, the use of a non-dialable routing number for the direct access arrangement allows the host to communicate only with terminals connected to the line concentrator. Other potential calling parties, such as intruders, have no way of activating the non-dialable routing number. The use of a non-dialable number also reduces call setup time for switched access users, since data calls are initiated by emission of an off-hook signal at the line concentrator. Call setup time is also reduced for direct access users, since data calls are simply initiated by reception of an off-hook signal at the line concentrator. The invention also shifts all maintenance and administrative chores to the communication carriers.

DETAILED DESCRIPTION

Figure 1:
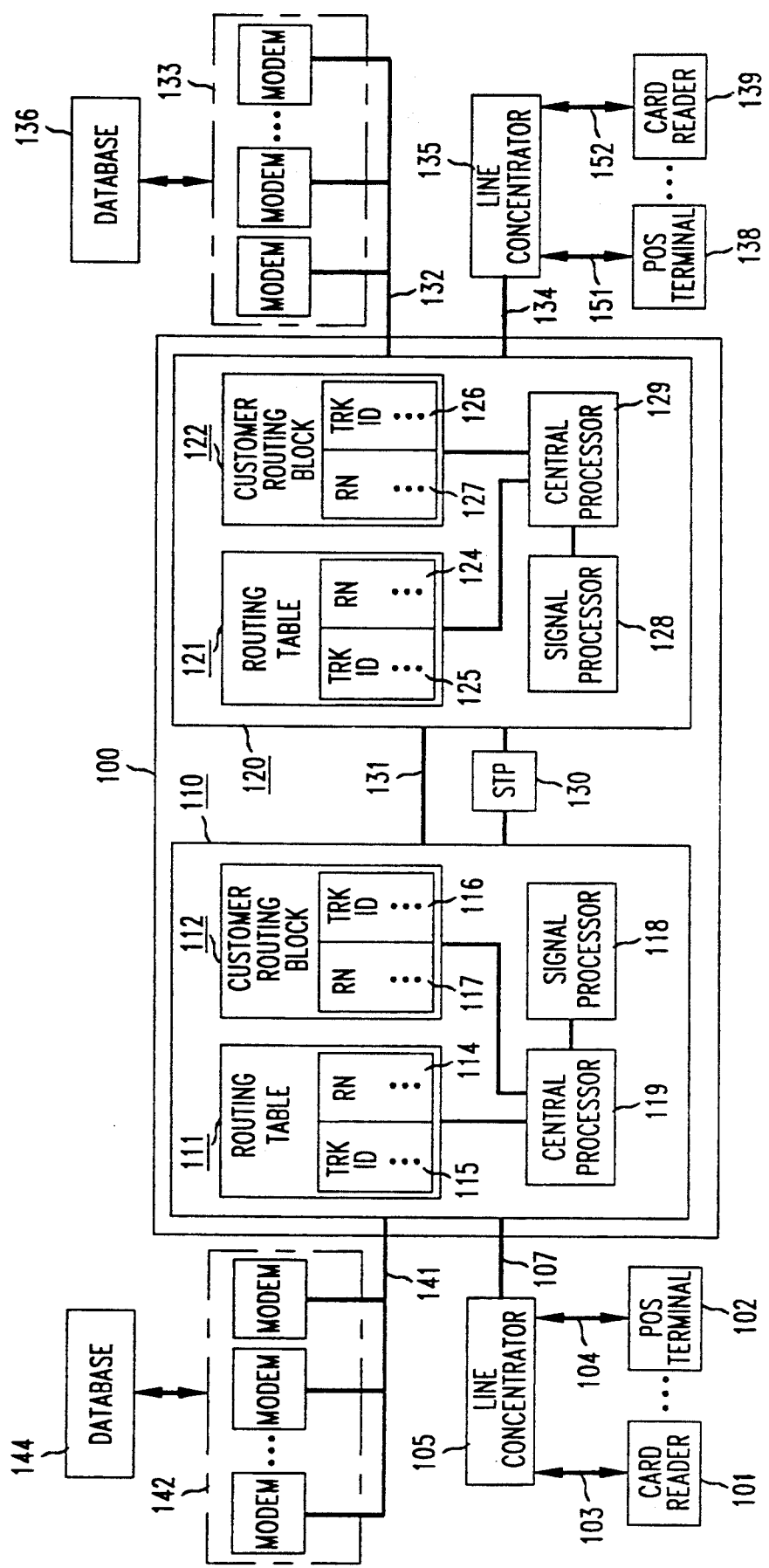
FIG. 1 shows, in block diagram form, a communication switching system arranged to complete short and bursty data transactions in accordance with the invention.

FIG. 1 shows, in block diagram form, a configuration for a communication switching system arranged to complete short and bursty data transactions. In FIG. 1, card reader 101 and Point-of-Sale (POS) terminal 102 are shown linked via access lines 103 and 104 to line concentrator 105. Similarly, card reader 139 and POS terminal 138 are shown connected to line concentrator 135 via access lines 152 and 151. Access to line concentrator 105 (135) may be via dedicated lines as shown in FIG. 1 or via a local switched access arrangement. In the latter case, the card reader initiates a call to line concentrator 105 (135) by dialing a number associated with the concentrator. In either arrangement, upon receiving the call, line concentrator 105 (135) may send an off-hook signal to access switch 110 (120) or places the call in a queue as described below.

Line concentrators 105 and 135 are connected via access links 107 and 134 to communication switching system 100. The latter is comprised of switches 110 and 120 and a signaling network represented by Signal Transfer Point (STP) 130. Switches 110 and 120 are processor-controlled, software-driven switching systems that operate as points of access for terminals 101, 102, 138 and 139 and points of egress for databases 136 and 144. They also serve as access points to a Common Channel Signaling network (represented as described below by STP 130). Signal processors 118 and 128 in switches 110 and 120, respectively, are wired-logic processing units that a) scan for supervisory changes and b) receive and transmit signals to other switches directly through intermachine trunk 131 or via the signaling network represented by STP 130. Central processors 119 and 129 in switches 110 and 120, respectively, provide path information to route a call over the network. Switches 110 and 120 may be implemented using the AT&T No. 4ESS TM switch or the AT&T 5ESS ® switch. A detailed description of the structure of the AT&T 5ESS ® switch is provided in *AT&T Technical Journal*, Vol. 64, No. 6, part 2, pp. 1305-1564, July/August, 1985. The features and functionality of the AT&T No. 4ESS switch are explained extensively in *Bell System Technical Journal* (BSTJ), Vol. 56, No. 7, pp. 1015-1320, September, 1977.

When switch 110 (120) acts as an access switch, it translates off-hook signals received from line concentrator 105 (135) over access link 107 (134) to a non-dialable routing number by accessing routing table 111 (121). Routing tables 111 and 121 are translation tables, each of which correlates a routing number to the trunk identification number of access trunk 107 (134). Conversely, when switch 110 (120) acts as an egress switch, it translates the routing number received from access switch 110 (120) to the trunk identification number for egress trunk 132 (141) by accessing customer routing block 112 (122).

Switches 110 and 120 exchange call handling messages via a data network called the Common Channel Signaling network. The latter is a packet switching network composed of a plurality of interconnected nodes called Signal Transfer Points (STPs) that are used to exchange call handling messages between switches according to a specific protocol, such as SS7. However, for the sake of simplicity, the signaling network is represented in FIG. 1 by a single Signal Transfer Point, namely STP 130. The features and functionality of an STP are described in the book *Engineering and Operations in the Bell System*, Second Edition, pp 292-294, AT&T Bell Laboratories Inc., 1982.

Switches 110 and 120 are also connected to modem pools 133 and 142 respectively via links 132 and 141. Modem pool 133 (142) is comprised of a plurality of modems which convert analog signals received from switches 110 (120) to digital signals forwarded to the terminals/card readers or databases 144 and 136. Database 144 (136) is a computer system running database management system software, such as Informix TM SQL or Oracle TM 4GL to search and retrieve data contained in attached storage facilities. Data stored may include for example, stolen credit card number, credit card numbers for which credit privileges have been suspended or terminated, credit limit information, etc,. For Point-of-Sale applications, financial information, such as account balance, Personal Identification Number (PIN), types of accounts, etc., may be stored. Line concentrator 105 (135) is described in detail immediately below.

Figure 2:
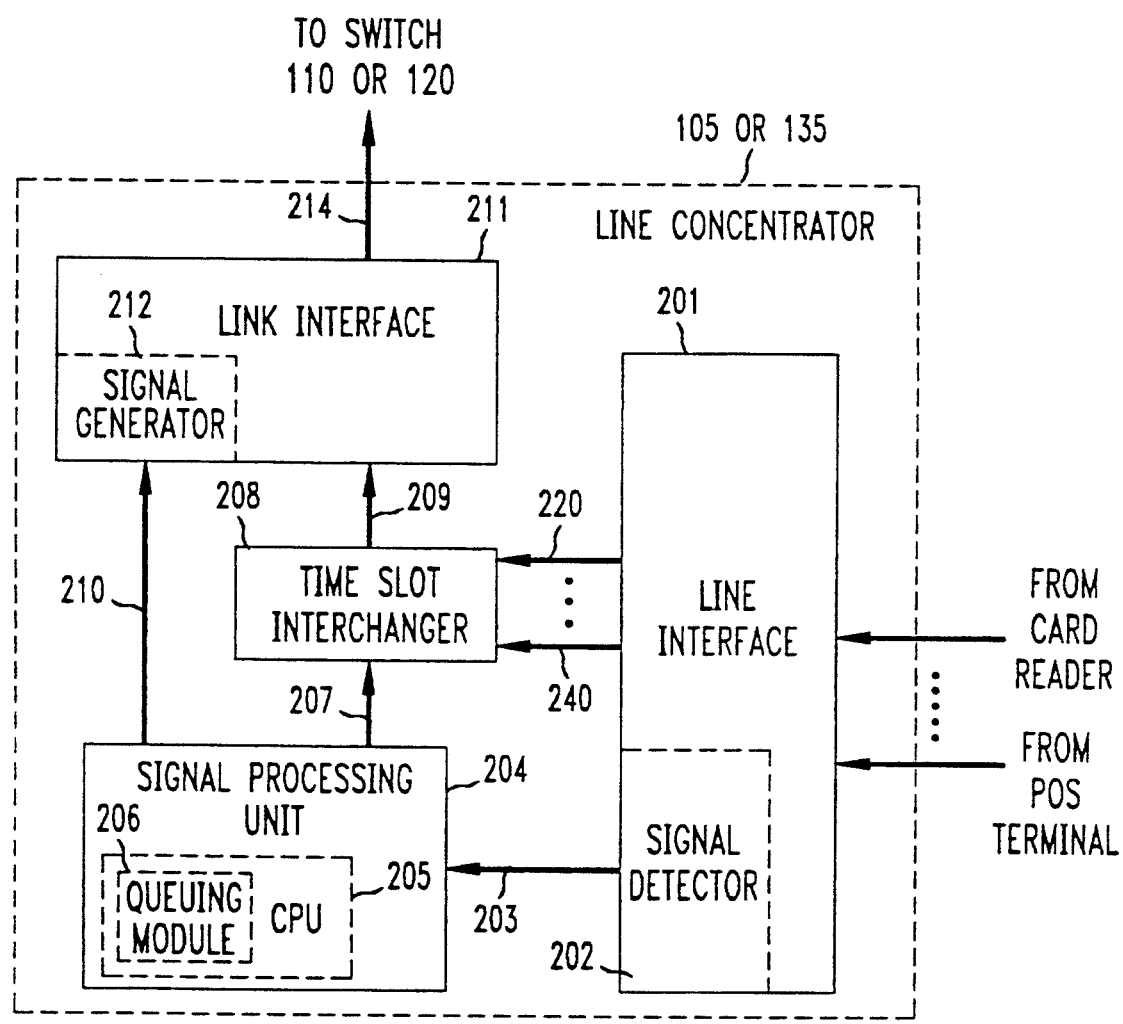
FIG. 2 shows a line concentrator arranged in accordance with the invention.

FIG. 2 shows a line concentrator arranged in accordance with the invention. Line concentrator 105 or 135 depicted in FIG. 2 is comprised of modular components which include line interface 201, signal processing unit 204, time slot interchanger 208, and link interface 211.

Line interface 201 terminates the access lines from devices, such as card readers and POS terminals to the line concentrator. Signals from these devices are typically multiplexed over access carder facilities and terminated in a digital physical interface, such as line interface 201. One well-known line interface unit which may be used with appropriate modifications to implement line interface 201 is the DS-1 standard interface. The technical specification of a DS-1 interface are provided in AT&T Technical Publication 62411, December, 1990. This interface specification applies to local switch access as well as dedicated access.

Signals transmitted or received by the card readers and POS terminals are received or transmitted as data bytes occupying a time-slot on line interface 201. These time slots also contain supervisory data indicating the active or idle state of the device (on-hook/off-hook). The time slots are extracted by line interface 201 and sent to time slot interchanger 208. The supervisory data is detected by signal detector 202 and sent to signal processing unit 204 via signal bus 203. Link Interface 211 has an identical function as line interface 201 for access link 214. Time slot interchanger 208 and signal processing unit 204 provide the means for access lines to be interconnected one at a time to link 214, as described below. Both the line interface and link interface maintain the appropriate signals when a particular line or link 214 is in an idle or wait state.

Time slot interchanger 208 plays the role of a switching matrix for the line concentrator by connecting channels from line interface 201 to bus 209 connected to link interface 211. Time slot interchanger 208 sends and receives time slot data from all the outgoing channels (220 to 240) from line interface 201. Time slot interchanger 208 which operates under the control of signal processing unit 204, maps one of the incoming channels (220 to 240) to bus 209 connected to link interface 211. When an incoming call is received and link 214 has already been seized, a dam path is established between the transmitting device and time slot interchanger 208. When time slot interchanger 208 receives instructions from signal processing unit 204 to allow a specific data path to be extended to bus 209, time slot interchanger disconnects the other data path connected to bus 209 and connects the data path designated by signal processing unit 204.

At the heart of line concentrator 105 or 135 is signal processing unit 204 which controls the operations of the other components in the line concentrator. Signal processing unit 204 is comprised of central processing unit (CPU) 205 which executes instructions stored in its memory. A sample of the instructions stored in the CPU 205 memory is provided in FIG. 3. CPU 205 also stores in its memory the internal logic of the line concentrator. For example, signal processing unit 204 creates a record for incoming calls by logging a) the identification number of the channel on which the off-hook signal was received and b) the order in which the off-hook signal arrived. The record is stored in a separate portion of CPU 205 memory, namely queuing module 206 which is arranged to purge older record entries when calls associated with those records are completed and move remaining records that have been on the entry list the longest to the top of the list. Queuing module 206 is thus arranged to implement a first-in first-out queuing management algorithm. When signal processing unit 204 receives an off-hook signal from signal detector 202 via signal bus 203, signal processing unit 204 checks the queue in queuing module 206 to determine whether there are any calls waiting to be completed. If there are no calls in the queue and link 214 to access switch 110 (120) of FIG. 1 is idle, signal processing unit 204 instructs signal generator 212 to send an off-hook signal to access switch 110 or 120 to establish communications with database 136 or 144 of FIG. 1. If a subsequent off-hook signal is received by the signal processing unit 204 and link 214 is active, that call is placed at the bottom of the queue. When signal processing unit 204 receives an on-hook signal from signal detector 202 via signal bus 203, signal processing unit 204 checks the queue in queuing module 206 to determine whether there are any calls to be completed. If there are calls to be completed, time slot interchanger 208 a) maintains the link 214 active, b) reconfigures the time slot interchanger 208 to disconnect the completed call and connects the first call in the queue to link 214. If there are no calls in the queue and link 214 to access switch 110 (120) of FIG. 1 is idle, signal processing unit 204 instructs signal generator 212 to send an on-hook signal to access switch 110 or 120 to terminate all communications with database 136 or 144 of FIG. 1.

Figure 3:
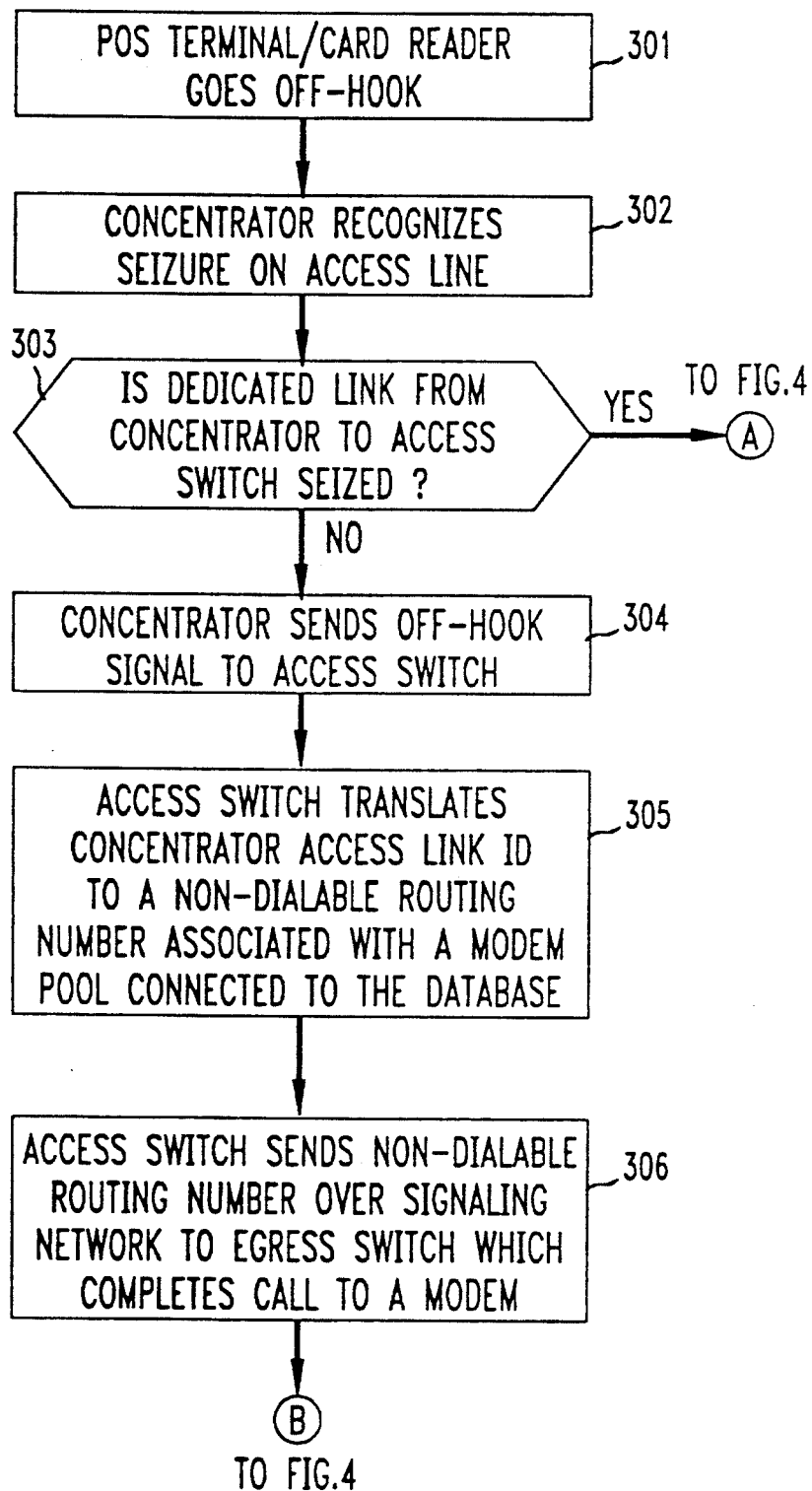
FIG. 3 and FIG. 4 are flowcharts illustrating different steps performed by various components of a communication switching system to complete short and bursty data transactions.
Figure 4:
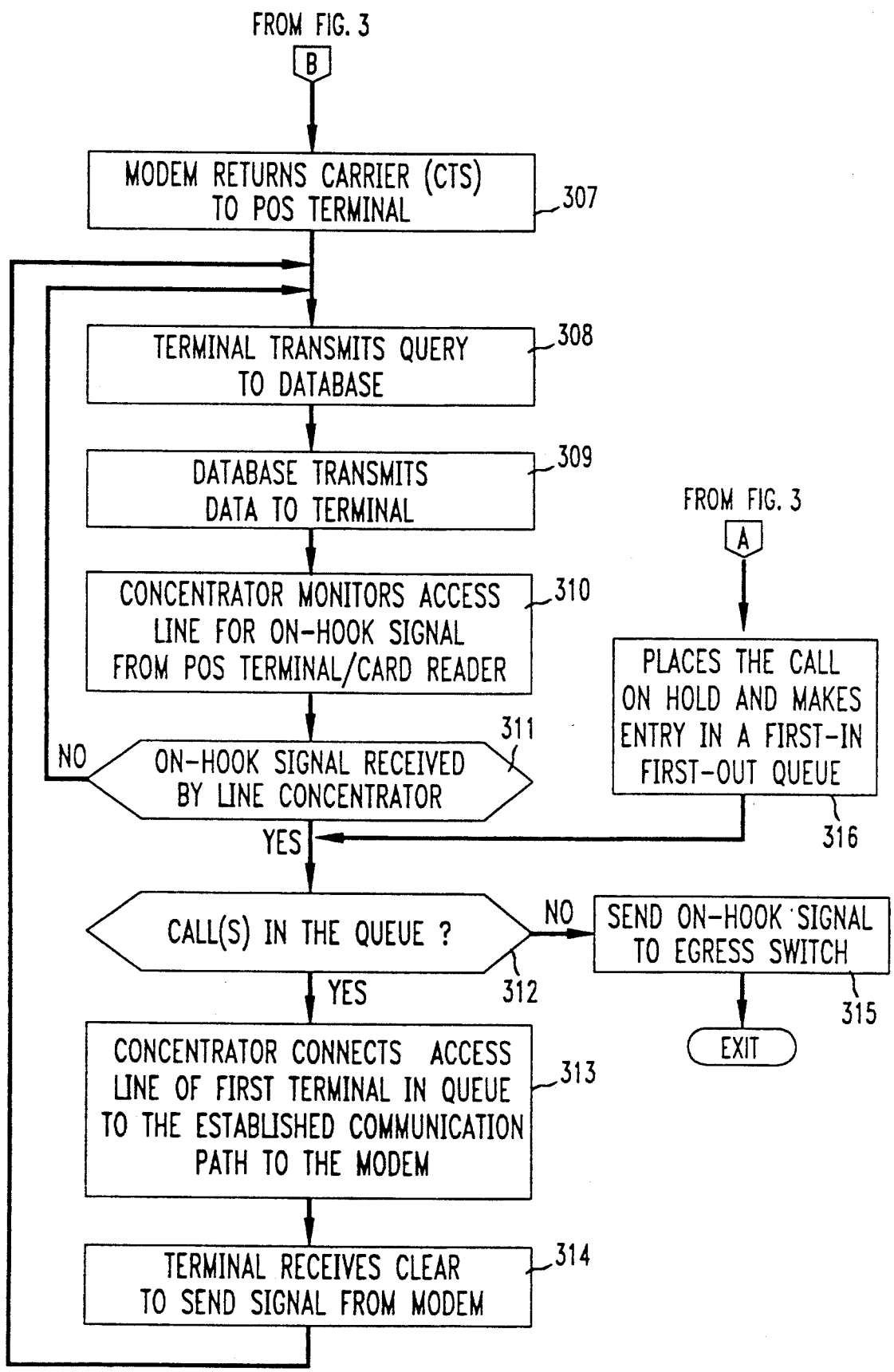

Referring to FIGS. 3 and 4, the process contemplated by the invention for completing a series of data calls servicing short duration data transactions is set in motion, in step 301 when a device (POS terminal or a card reader), such as card reader 101, for example, goes off-hook. This may be accomplished, for example, when a sales clerk inserts a credit card into the magnetic head of the card reader which causes the closing of electrical contacts to allow the information encoded in the magnetic stripe of the card to be read, decoded and converted into electrical signals. The closing of the electrical contacts causes the card reader to go off-hook. In step 302, line concentrator 105 or 135 recognizes seizure on the access line. Line concentrator 105 (135) determines in step 303, whether link 107 (134) connecting the concentrator to the access switch is seized. Upon a negative answer to that inquiry, line concentrator 105 (135), in step 304 sends an off-hook signal to access switch 110 (120) via access link 107 (134). Access switch 110 (120) in step 305, translates the identification number of link 107 (134) to a non-dialable routing number associated with modem pool 133 (142) in accordance with the techniques described above. Access switch 110 (120) proceeds in step 306, to forward the non-dialable routing number over STP 130 to egress switch 120 (110) which completes the call to an available modem in modem pool 133 (142). In step 307, the modem returns a clear-to-send signal to the originating device indicating that a connection has been established between database 144 (136) and the device. The clear-to-send signal completes the handshake protocol between the device (card reader, POS terminal) its associated modem (if any), the modem connected to the database, and the database itself. In step 309, the originating device, such as card reader 101 (139) transmits a query to database 136 (144). In response to that query, database 136 (144) transmits data to the device. The data received by the device, such as card reader 101 (139) is typically displayed on a screen for the benefit of the user. In step 310, signal detector 202 of line concentrator 105 (135) monitors access line 104 (134) to determine in step 311, whether one of the signals forwarded by the device, such as card reader 101 (139) to database 144 (136) is an on-hook signal. Steps 308 are 309 are repeated until an on-hook signal is received by line concentrator 105 (135) from the device, such as card reader 101 (139).

If, as a result of the inquiry in step 303, it is determined that access link 107 (134) has already been seized, line concentrator 105 (135) places the call on hold and makes an entry in the first-in-first-out queue in queuing module 206. When an on-hook signal is received from a terminal or a card reader in step 312, line concentrator 105 (135) checks the queue to determine whether any calls are on hold. If calls are still on hold, line concentrator 105 (135) connects the access line of the first POS terminal/card reader on the queue to the established communication path to the modem in accordance with the techniques described above. Upon receiving in step 314 a clear-to-send signal from the modem, steps 308 to 314 are repeated for each call until all calls on the queue have been completed. It is worth noting that the end modem experiences a temporary loss of carrier in the short interval between termination of the previous call and connection of the call that has been in the queue the longest. Database 144 (136) is arranged not to initiate call termination procedures due to loss of carrier for a short period of time. At this stage, it becomes necessary to synchronize the new device and the modem. After the temporary loss of carrier, the end modem waits a predetermined interval of time and then sends a new clear-to-send signal to the POS terminal or card reader that has been waiting to send a query to database 136 (144). When no calls are left in the queue, CPU 205 of line concentrator 105 (135), in step 315 sends a signal to signal generator 212 instructing it to generate an on-hook signal to be forwarded to egress switch 120 (110) to tear down the connection to the modem.

The above description is to be construed as only an illustrative embodiment of this invention. Persons skilled in the art can easily conceive of alternative arrangements providing functionality similar to this invention without any deviation from the fundamental principles or the scope of this invention. For example, although processing of calls in the queue has been illustrated to operate on a first-come first-serve basis, other priorities arrangements can be devised such that certain "newer" calls are given priority over "older" calls in the queue. Similarly, it is possible to use a buffering arrangement in our queuing apparatus to receive small data packets therein prior to establishing a connection to a database.

We claim:

1. A method of completing each call in a burst of calls a) originating from a plurality of sources each connected to a line concentrator and b) directed to a common destination, wherein said method comprises the steps of:
    establishing an initial connection between a first one of said sources and said common destination through a communication path extending from said line concentrator to said common destination;
    queuing subsequent calls in said burst of calls in said line concentrator when said communication path to said common destination is in use;
    inhibiting the release of said communication path for the duration of said burst of calls; and
    completing each subsequent call in said burst of calls by establishing a connection between a different one of said sources and said common destination, wherein said connection includes said communication path.

2. The method of claim 1, wherein said call completion step includes the steps of:
    determining the order in which each subsequent call is received; and
    establishing said connection for each said subsequent call on a first-come first-serve basis.

3. The method of claim 1, wherein said method includes the step of receiving an off-hook signal from a different source in said line concentrator for each call.

4. The method of claim 1, wherein said queuing step includes the step of placing calls waiting to be completed on hold.

5. The method of claim 1 wherein said method includes the step of completing each call via a) a dedicated link between said line concentrator and an originating switch and b) a dedicated link between said common destination and a terminating switch, wherein said switches are arranged to allow said sources to communicate only with said common destination.

6. The method of claim 1, wherein said method includes the step of:
    initiating calls from said sources to said line concentrator which, in response to said calls, requests connection to said database for each call through the emission of an off-hook signal.

7. A method of completing each call that services a short duration data transaction in a series of such calls which a) are initiated within a short time period from a plurality of devices, and b) which are destined to a database, wherein said method comprises the steps of:
    establishing an initial communication path between a call queuing apparatus connected to said devices and said database for the purpose of completing the first one of said calls;
    queuing in said queuing apparatus all subsequent incoming calls while said communication path is in use;
    without releasing said communication path between said calls, completing each call in said series of calls by establishing a connection which includes at least a first segment and a second segment, wherein said first segment includes said communication path, and said second segment includes a path from said line concentrator to a different one of said devices; and
    releasing said communication path when the last call in said series of calls has ended.

8. In a communication switching system which includes a) an egress switch connected to a database, and b) an access switch connected to a line concentrator linked to a plurality of devices, a method of completing calls from said devices to said database, wherein said method comprises the steps of:
    a) for a first group of calls, initiated sequentially by said plurality of devices to said database, establishing an initial connection between said database and a first one of said devices which requested access to said database, wherein said initial connection includes a communication link between said line concentrator and said database;
    b) queuing in said line concentrator all incoming calls within said group of calls while said communication link is in use;
    c) maintaining said communication link for all subsequent calls in said group of calls; and
    d) completing each subsequent call in said group of calls by establishing a connection which includes said communication link and a different path between said line concentrator and each one of said devices;
    e) releasing said communication link between said line concentrator and said database at the end of said group of calls; and
    f) repeating steps a) through e) for each subsequent group of calls.

9. A system of completing each call in a burst of calls a) originating from a plurality of sources each connected to a line concentrator and b) destined for a common destination, wherein said system comprises:
    means for establishing an initial connection between a first one of said sources and said common destination through a communication path extending from said line concentrator to said common destination;
    means for queuing subsequent calls in said burst of calls in said line concentrator when said communication path to said common destination is in use;
    means for inhibiting the release of said communication path for the duration of said burst of calls; and
    means for completing each subsequent call in said burst of calls by establishing a connection between a different one of said sources and said common destination, wherein said connection includes said communication path.

10. The system of claim 9, wherein said call completion means includes:
    means for determining the order in which each subsequent call is received; and
    means for establishing said connection on a first-come first-serve basis.

11. The system of claim 9, wherein said line concentrator is connected to an originating switch and said database is connected to a terminating switch and said switches are arranged to allow said sources to communicate only with said database.

12. The system of claim 9, wherein said calls are initiated by said sources emitting only an off-hook signal.

13. The system of claim 9, wherein said queuing means includes means for placing calls waiting to be completed on hold.

14. The system of claim 9, wherein said sources initiate calls to said concentrator which initiates calls to said common destination through the emission of an on-hook signal to establish a connection between said devices and said common destination.

15. A system of completing each call that services a short duration data transaction in a series of such calls which are initiated within a short time period from a plurality of devices and which are destined to a database, wherein said system comprises:

means for establishing an intitial communication path between a call queuing apparatus connected to said devices and said database for the purpose of completing the first one of said calls;

means for queuing in said call queuing apparatus all incoming calls while said communication path is in use;

without releasing said communication path between said calls, means for completing each call in said series of calls by establishing a connection which includes at least a first segment and a second segment, wherein said first segment includes said communication path, and said second segment includes a path from said call queuing apparatus to a different one of said devices; and means for releasing said communication path when the last call in said series of calls has ended.

16. In a communication switching system which includes a) an egress switch connected to a database, and b) an access switch connected to a line concentrator linked to a plurality of devices, a system for repetitively completing groups of calls from said devices to said database, said system comprising:

for each group of calls, means for establishing an initial connection between said database and a first one of said devices which requested access to said database, wherein said initial connection includes a communication link between said line concentrator and said database;

means for queuing in said line concentrator all incoming calls for said group of calls while said communication link is in use;

means for maintaining said communication link for all subsequent calls in said group of calls;

means for completing each subsequent call in said group of calls by establishing a connection which includes said communication link and a different link between said line concentrator and each one of said devices; and means for releasing said communication link at the end of said group of calls.

* * * * *